US012121085B2

(12) United States Patent
Hughes

(10) Patent No.: US 12,121,085 B2
(45) Date of Patent: Oct. 22, 2024

(54) AUGMENTED FACE MASK

(71) Applicant: RAYTHEON COMPANY, Tewksbury, MA (US)

(72) Inventor: Tadd Bernard Hughes, Andover, MA (US)

(73) Assignee: Raytheon Company, Tewksbury, MA (US)

( * ) Notice: Subject to any disclaimer, the term of this patent is extended or adjusted under 35 U.S.C. 154(b) by 909 days.

(21) Appl. No.: 17/071,485

(22) Filed: Oct. 15, 2020

(65) Prior Publication Data

US 2022/0117331 A1 Apr. 21, 2022

(51) Int. Cl.
*A41D 13/11* (2006.01)
*A41D 31/04* (2019.01)
*A62B 18/02* (2006.01)

(52) U.S. Cl.
CPC ...... *A41D 13/1115* (2013.01); *A41D 13/1161* (2013.01); *A41D 31/04* (2019.02); *A62B 18/02* (2013.01)

(58) Field of Classification Search
CPC . A41D 13/11; A41D 13/1115; A41D 13/1161; A41D 31/04; A62B 18/02; A62B 23/025
See application file for complete search history.

(56) References Cited

U.S. PATENT DOCUMENTS 4,966,140 A * 10/1990 Herzberg ............... A42B 1/045 128/206.13
2007/0157932 A1* 7/2007 Cerbini .............. A41D 13/1138 128/205.27
2012/0272973 A1 11/2012 Palomo et al.
2013/0186414 A1* 7/2013 Suzuki ............... A41D 13/1161 128/863
2014/0182593 A1* 7/2014 Duffy .................. A62B 23/025 128/206.19
2015/0059772 A1 3/2015 Duffy
(Continued)

FOREIGN PATENT DOCUMENTS

JP 3212967 U 10/2017
JP 2017186701 A 10/2017
(Continued)

OTHER PUBLICATIONS

International Search Report and Written Opinion in International Patent Application No. PCT/US2021/054766 dated Feb. 22, 2022.
(Continued)

*Primary Examiner* — Timothy A Stanis
(74) *Attorney, Agent, or Firm* — Schwegman Lundberg & Woessner, P.A.

(57) ABSTRACT

Protective garments and face masks are provided that include a body portion having a plurality of exterior pleats configured to elongate in a first direction. The body portion further has an outer surface and an inner surface. The body portion further has an inner portion with a plurality of interior pleats connected between an upper edge of the body portion and a sealing surface. The inner portion is configured to elongate in a second direction at an acute angle from the first direction. In certain implementations, the sealing surface simultaneously contacts a nose and cheeks of a wearer in response to the elongation in the second direction.

20 Claims, 8 Drawing Sheets

(56) References Cited

U.S. PATENT DOCUMENTS

| | | | | |
|---|---|---|---|---|
| 2016/0174631 A1* | 6/2016 | Tong | A01N 25/34 | |
| | | | 427/457 | |
| 2017/0312558 A1* | 11/2017 | Wang | A62B 23/025 | |
| 2018/0160748 A1* | 6/2018 | Yoshida | A62B 23/025 | |
| 2019/0174845 A1 | 6/2019 | Cheng et al. | | |
| 2020/0121004 A1* | 4/2020 | Loughran | A62B 18/08 | |

FOREIGN PATENT DOCUMENTS

| | | |
|---|---|---|
| KR | 20100008169 U | 8/2010 |
| KR | 20110008148 A | 1/2011 |
| WO | 20200127860 A1 | 6/2020 |
| WO | 2022081696 | 4/2022 |

OTHER PUBLICATIONS

"International Application Serial No. PCT US2021 054766, International Preliminary Report on Patentability mailed Apr. 27, 2023", 7 pgs.

* cited by examiner

AUGMENTED FACE MASK

BACKGROUND

Face masks have been developed to be worn by healthcare workers during patient interaction to prevent the spread of bacteria, viruses, germs, and other contaminants between the parties that could otherwise lead to infection or illness. These masks are typically disposable devices for retaining droplets released from the mouth and/or nose of the wearer thereby reducing exposure to the patient.

SUMMARY

Aspects and embodiments are generally directed to garments and face masks that an inner portion including a plurality of interior pleats connected to a sealing surface. In certain implementations, the sealing surface simultaneously contacts a nose and cheeks of a wearer.

According to one aspect, a face mask is provided comprising a body portion including a plurality of exterior pleats configured to elongate in a first direction towards a chin of a wearer of the face mask, the body portion having an outer surface and an inner surface, and an inner portion including a plurality of interior pleats connected between an upper edge of the body portion and a sealing surface, the inner portion configured to elongate in a second direction towards a nose of the wearer at an acute angle from the first direction, wherein the sealing surface simultaneously contacts cheeks and the nose of the wearer in response to the elongation in the second direction.

In one example, the inner portion is fabricated from a flexible material.

In another example, the flexible material includes one or more of foam including a hydrophobic coating, cotton, and polypropylene.

In one example, the flexible material is coated with a hydrophobic coating.

In another example, the plurality of interior pleats includes the hydrophobic coating applied to surfaces connecting each of the plurality of interior pleats, the surfaces being exposed to the wearer's exhalation.

In one example, the inner portion is attached to the inner surface of the body portion by one or more of stitching and adhesive.

In one example, the plurality of interior pleats is configured to retain a shape of the sealing surface when simultaneously contacting the nose and the cheeks of the wearer.

In another example, the inner portion further comprises a nose wire configured to retain the shape of the sealing surface when simultaneously contacting the nose and the cheeks of the wearer.

In one example, the mask further comprises a first ear loop configured to secure the face mask to a first ear and a second ear loop configured to secure the face mask to a second ear.

In another example, the mask further comprises a first pair of straps configured to be tied together to secure the face mask to a first ear and a second pair of straps configured to be tied together to secure the face mask to a second ear.

According to one aspect, a protective garment is provided comprising a body portion including a plurality of exterior pleats configured to elongate in a first direction towards a chin of a wearer of the protective garment, and an inner portion including a plurality of interior pleats connected between an upper edge of the body portion and a sealing surface, the inner portion configured to elongate in a second direction towards a nose of the wearer at an acute angle from the first direction.

In one example, the inner portion is fabricated from a flexible material.

In another example, the flexible material includes one or more of foam including a hydrophobic coating, cotton, and polypropylene.

In one example, the flexible material is coated with a hydrophobic coating.

In another example, the plurality of interior pleats includes the hydrophobic coating applied to surfaces connecting each of the plurality of interior pleats, the surfaces being exposed to the wearer's exhalation.

In one example, the inner portion is attached to the inner surface of the body portion by one or more of stitching and adhesive.

In another example, the plurality of interior pleats is configured to retain a shape of the sealing surface when simultaneously contacting the nose and the cheeks of the wearer.

In one example, the inner portion further comprises a nose wire configured to retain the shape of the sealing surface when simultaneously contacting the nose and the cheeks of the wearer.

In another example, the protective garment further comprises a first ear loop configured to secure the protective garment to a first ear and a second ear loop configured to secure the protective garment to a second ear.

In one example, the protective garment further comprises a first pair of straps configured to be tied together to secure the protective garment to a first ear and a second pair of straps configured to be tied together to secure the protective garment to a second ear.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures may be represented by a like numeral. For purposes of clarity, not every component may be labeled in every figure. In the figures.

DETAILED DESCRIPTION

Due to the recent pandemic of the SARS-Cov-2 virus (i.e., Covid-19), there has been a growing need for face/surgical masks to combat the spread of the virus. To form to the wearer's face while being worn, conventional face masks incorporate the use of pleats around the mouth area of the wear to produce a better fit around the chin of the wearer. However, this design is problematic. The amount of contact between the mask and the area of the face near the bridge of the nose and cheeks is not sufficient, thereby causing humidified air to be expelled through the gaps left near the top of the mask. These gaps not only cause those wearers with glasses to experience their lens fogging up, but the expelled humidified breath of the wearer escapes into the environment. If the expelled breath contains bacteria, viruses, or other contaminants, the effectiveness of the mask is drastically reduced.

Aspects and embodiments offer a solution that reduces the amount of humidified breath escaping toward the eyes and cheeks of the wearer and also provides an overall better seal between the top portion of the mask and the wearer's face, thereby improving the mask's effectiveness compared to prior solutions. Disclosed herein are protective garments and face masks, including medical grade face masks, that utilize internal pleats to provide a better fit around a wearer's face and stopping most air from leaking around the nose.

Figure 1:
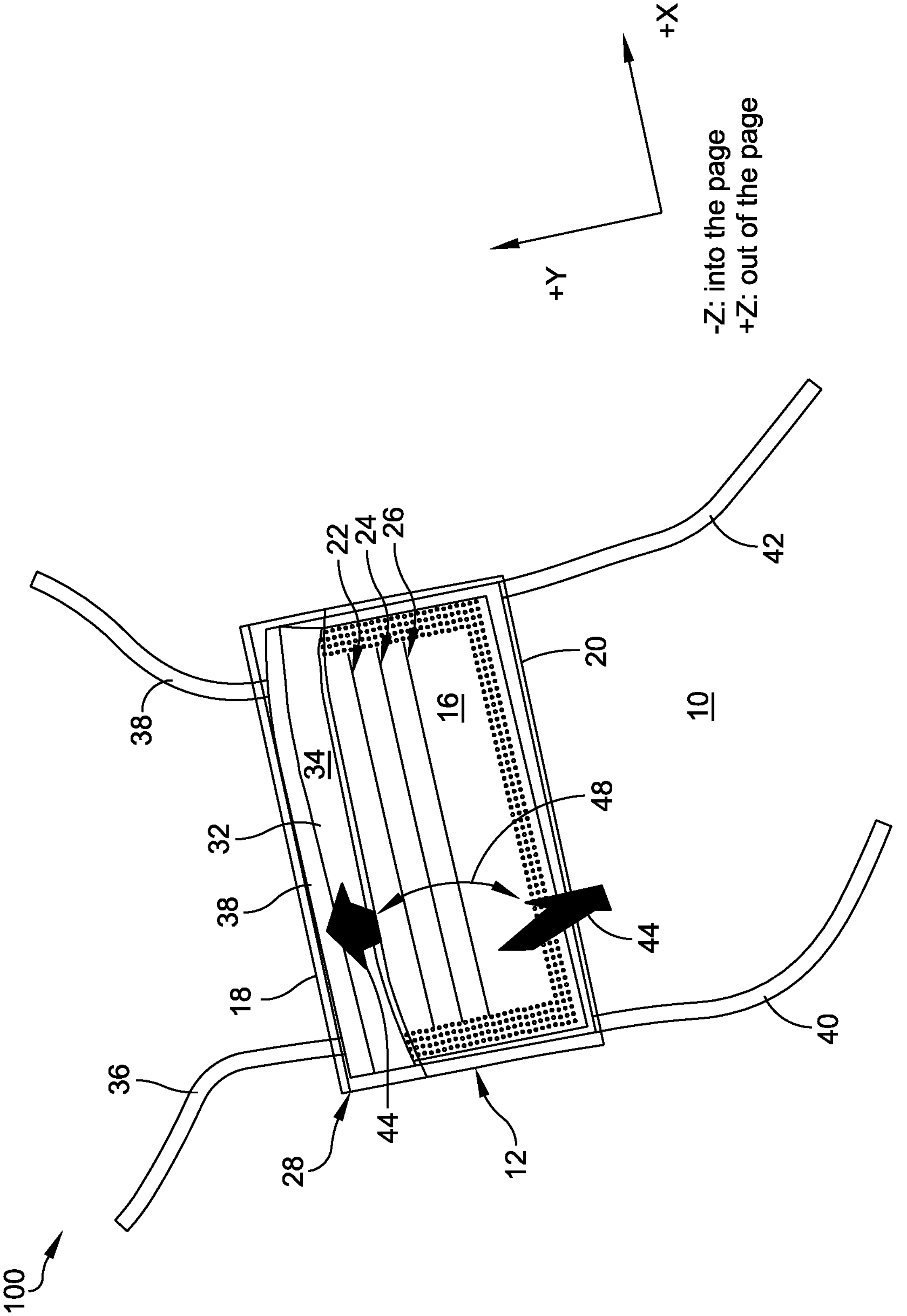
FIG. 1 illustrates a rear view of a face mask according to an embodiment of the present disclosure.

Referring to FIG. 1, a face mask generally indicated at 100 is illustrated laying frontside-down on a flat surface 10. The face mask 100 includes a body portion 12 having an inner surface 16. The body portion 12 further has an upper edge 18 and a lower edge 20. As shown in FIG. 1, the inner surface 16 of the body portion includes exterior pleats 22, 24, 26 formed horizontally within the body portion. The face mask 100 further includes an interior portion 28, which is secured to the inner surface 16 of the body portion 12 along the upper edge 18 of the body portion. The interior portion 28 includes interior pleats 32, 33 and a sealing surface 34. Each of the interior pleats 32, 33 contributes to contact with the interior area of the mask (i.e., not the outside air). As illustrated in FIG. 1, the interior portion 28 is folded flat like the rest of the face mask 100 such that the interior pleats 32, 33 are compressed together similar to how the exterior pleats 22, 24, 26 are compressed together. This configuration represents the face mask 100 being unused and not yet adjusted to conform to a wearer's face.

The face mask 100 further includes a first strap 36, a second strap 38, a third strap 40 and a fourth strap 42 secured to the outer edges of the body portion 12. In the shown embodiment, the face mask 100 includes two pairs of straps provided along each outer edges of the body portion 12, with each pair of straps being configured to be tied together to secure the mask 100 the face. For example, the first strap 36 and the third strap 40 provided at one other edge of the body portion 12 are configured to be tied together. According to certain examples, the first strap 36 and the third strap 40 are tied together to secure the mask 100 to a first ear of the wearer. The second strap 38 and the fourth strap 42 are configured to be tied together. According to certain examples, the second strap 38 and the fourth strap 42 are tied together to secure the mask 100 to a second ear of the wearer. It should be understood that other strap configurations may be provided to secure the body portion 12 of the face mask 100 to the wearer. For example, an elastic loop can be provided on one side of the body portion 12 of the face mask 100 and an elastic loop can be provided on the other side of the body portion of the face mask. In another example, a first elastic loop is provided on the upper edge 18 being connected at each corner thereof and a second elastic loop is provided on the lower edge 20 being connected at each corner thereof. Other examples include using hook-and-loop fasteners, strap adjusters, and/or release buckles in place of or in addition to the straps 36, 38, 40, 42 discussed above.

To secure the face mask 100 to a wearer's face and provide a good seal around the wearer's nose and mouth, the wearer grasps the lower edge 20 and pulls it along a path over the wearer's chin along a direction 46 (e.g., a first direction). Additionally, to engage the interior portion 28, a wearer grasps the innermost interior pleat 32 and pulls the sealing surface 34 along the direction 44 (e.g., a second direction) towards the nose and cheeks of the wearer. According to certain examples, the first direction is in the −Y/+X/+Z direction relative to the surface 10 and the second direction 44 is in the +Z direction relative to the surface 10, as illustrated in FIG. 1. The angle 48 formed by the intersection of the first direction 46 and the second direction 44, as shown in FIG. 1, is an acute angle (i.e., between 0 degrees and 90 degrees). Due to the variation of geometry between faces of different people, it is understood that the two directions 44, 46 described above will vary within a particular range depending on the particular user. In an example, the acute angle is 30 degrees. It is understood that certain examples include the second direction 44 being directly towards the face and the first direction 46 being the direction needed to secure the lower edge 20 beneath the chin.

Figure 2:
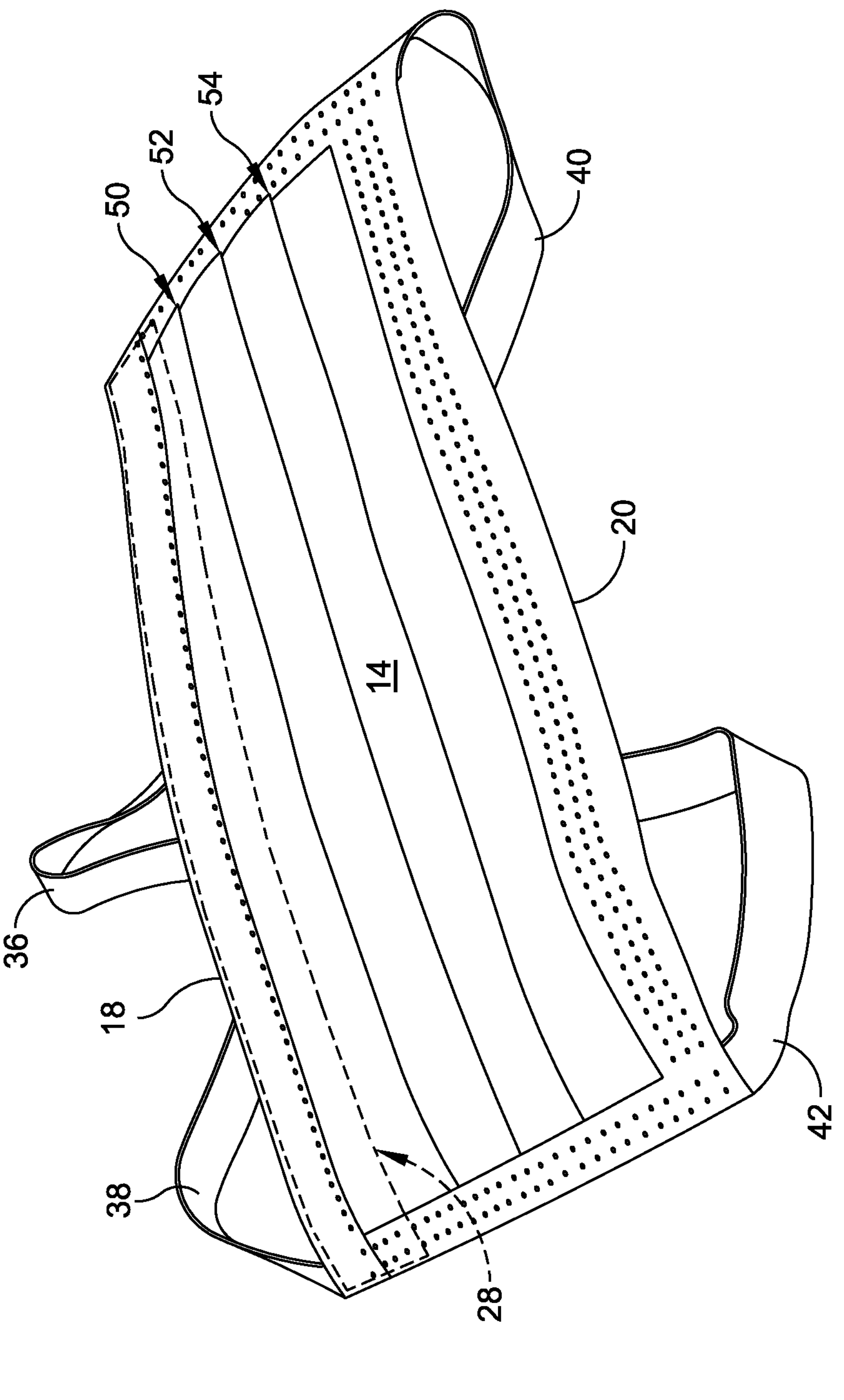
FIG. 2 illustrates a front view of a face mask according to an embodiment of the present disclosure.

Referring to FIG. 2, the face mask 100 illustrated in FIG. 1 is flipped over. As illustrated in FIG. 2, the face mask 100 includes an outer surface 14 and the outer portions of the exterior pleats 22, 24, 26. The interior portion 28 is represented by a dashed rectangle because it is occluded by the outer surface 14.

Figure 3:
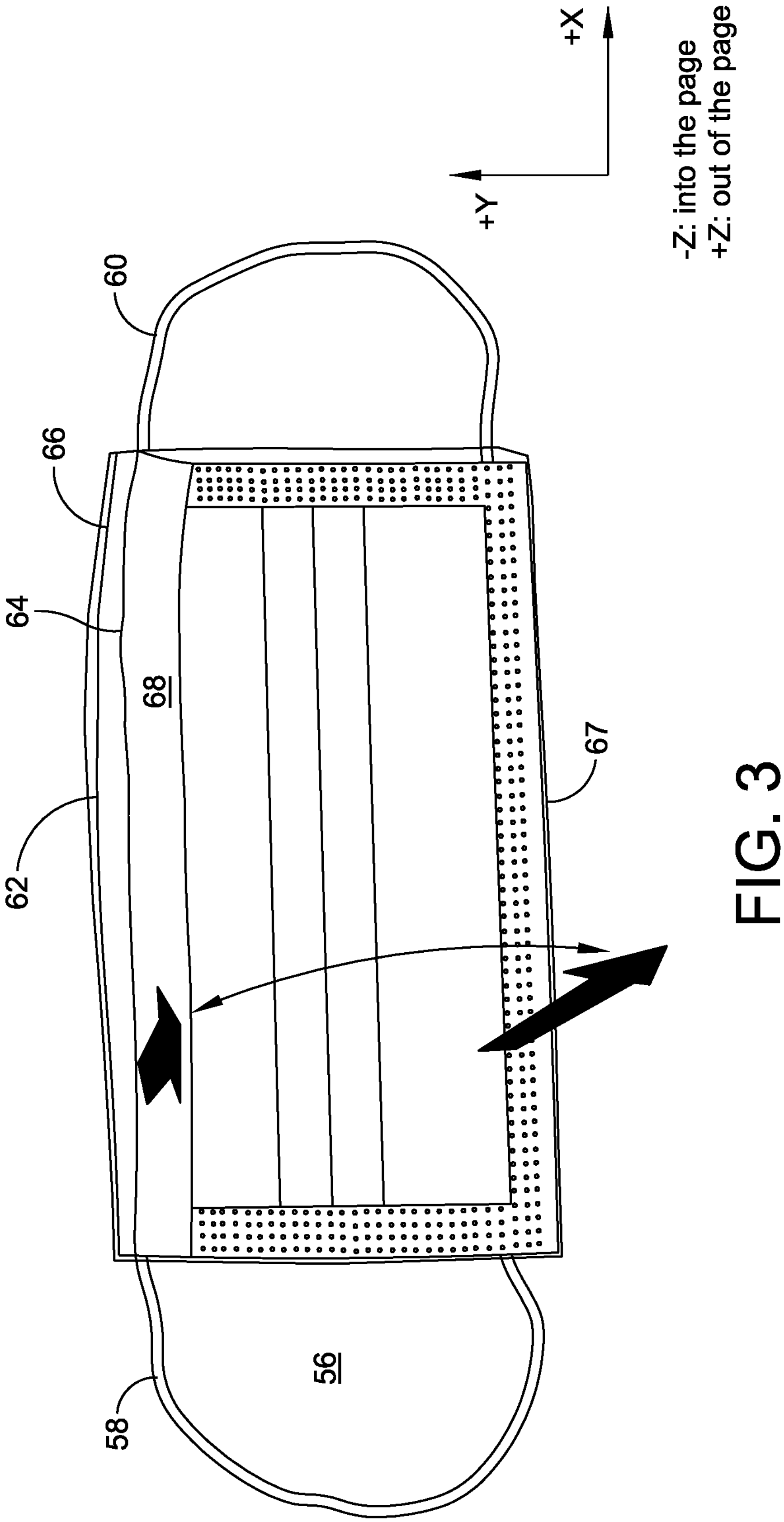
FIG. 3 illustrates a rear view of a face mask according to an embodiment of the present disclosure.

Referring to FIG. 3, a face mask generally indicated at 200 is illustrated laying frontside-down on a flat surface 56 (e.g., similar to the face mask 100 lying front-side down on the flat surface 10). The face mask 200 primarily differs from the face mask 100 illustrated in FIG. 1 by including a first elastic ear loop 58 and a second elastic ear loop 60 in place of the strap configuration. For the sake of brevity, it is understood the description above for the face mask 100 is entirely applicable to similar components of the face mask 200. For instance, the face mask 200 includes interior pleats 62, 64 (e.g., similar to interior pleats 32, 33), an interior portion 66 (e.g., similar to the interior portion 28), a body portion 67, and a sealing surface 68 (e.g., similar to the sealing surface 34).

Figure 4:
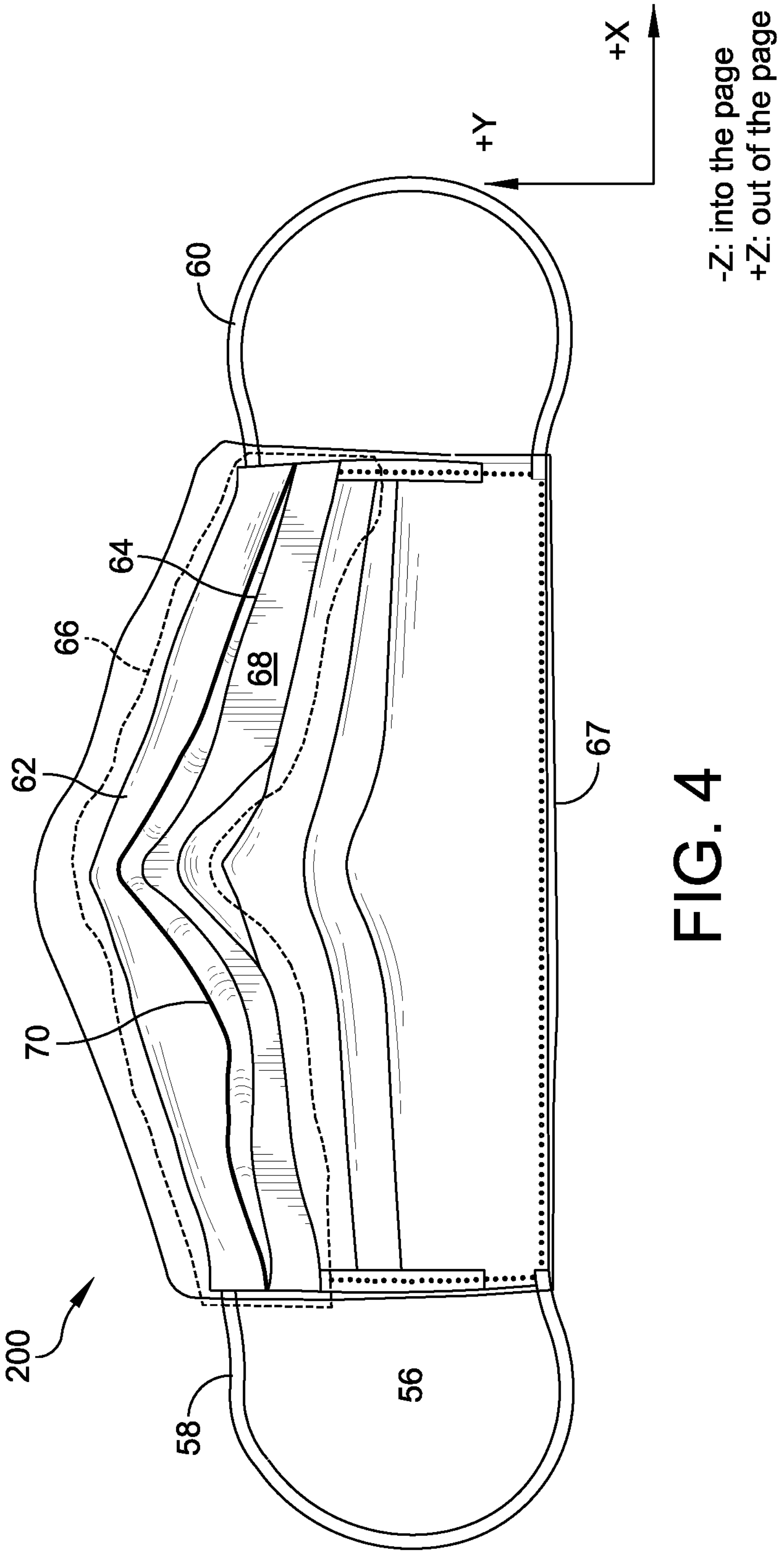
FIG. 4 illustrates a rear view of a face mask according to an embodiment of the present disclosure.

Referring to FIG. 4, after the wearer has manipulated the face mask 200 to conform to the shape around the nose and mouth, the interior portion 66 retains its shape, revealing an additional interior pleat 70, which is occluded by the interior pleat 64 in FIG. 3. The retention of the shape is owed, in some examples to a flexible material used to construct the interior portion 66. In some examples, the interior portion 66 is constructed from one or more of foam, cloth, and polypropylene. As illustrated in FIG. 4, the interior portion 66 is made of the same material as the body portion 67. In one example, the material is cotton. In another example, the material is an open-cell foam with a hydrophobic on its exterior (i.e., the side which is not in direct contact with the wearer's exhalation). In other embodiments, the interior portion 66 is constructed with a cloth mixed with an adhesive to add rigidity. In other examples, the interior portion 66 is constructed from one or more of the above materials, but also includes a nose wire to impart shape retention capability. Other materials and combinations thereof are contemplated herein. As an alternative to using the nose wire, certain aspects include a crease on each side of the central area of the sealing surface 68, each crease being configured to cause the sealing surface to bend around the nose of the wearer.

Figure 5:
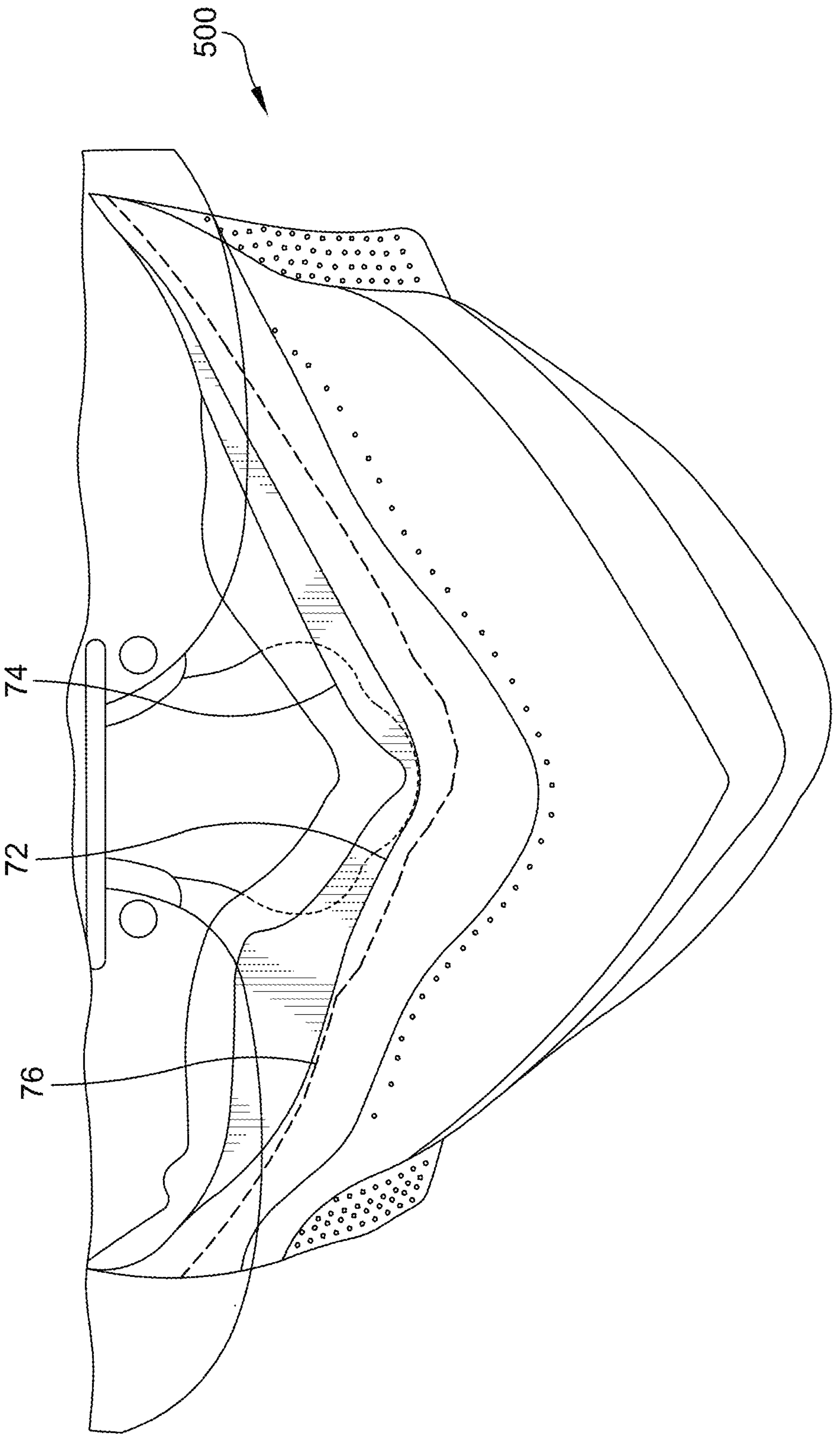
FIG. 5 illustrates a front view of a face mask being worn according to an embodiment of the present disclosure.
Figure 6B:
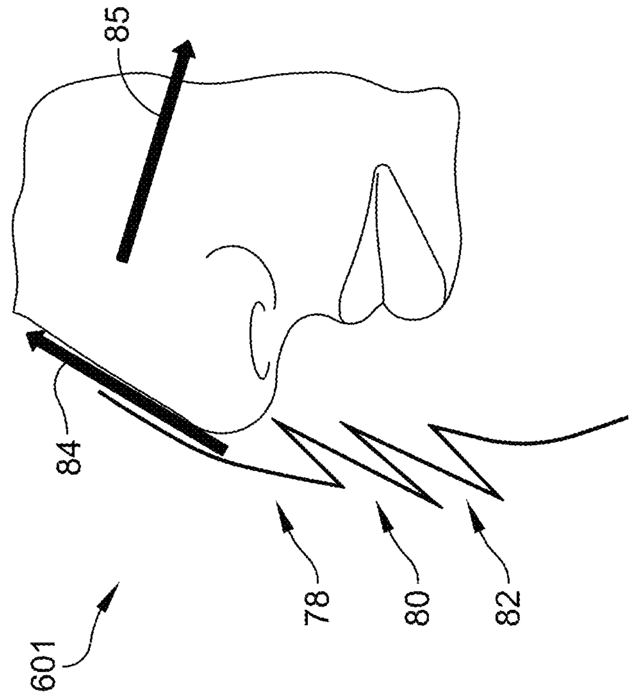
FIG. 6B (PRIOR ART)
FIG. 6B illustrates a schematic cross-sectional side profile of a prior art face mask permitting humid air to escape.
Figure 6A:
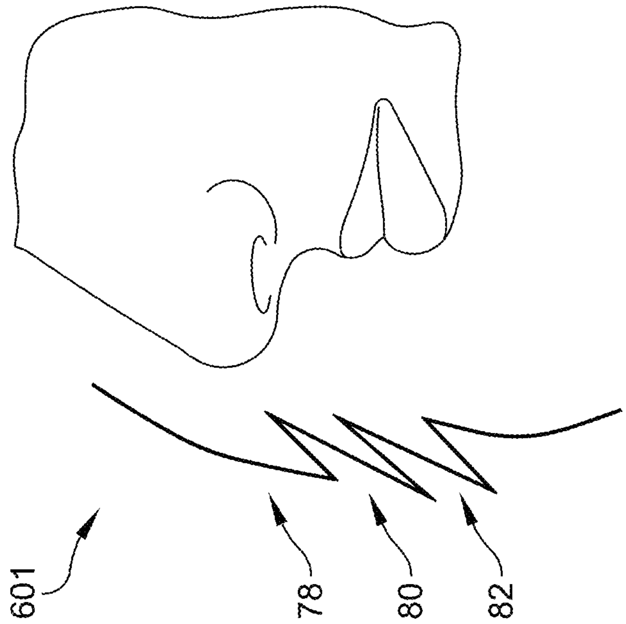
FIG. 6A (PRIOR ART)
FIG. 6A illustrates a schematic cross-sectional side profile of a prior art face mask showing a plurality of pleats near the mouth of a wearer of the mask.

Referring to FIG. 5, a face mask generally indicated at 500 (e.g., similar to the face mask 100 and the face mask 200) is illustrated being secured to a wearer's face. For the sake of brevity, the description of similar elements will be omitted. This view of the face mask 500 illustrates interior pleats 72, 74, 76, with the interior pleat 76 being represented by a dashed line because it is occluded. In certain aspects, one or both of the top pleat 72 and the rear pleat 74 includes one or more of a flexible wire, strip, or bar constructed from metal or plastic for shape retention. In some embodiments, the metal is aluminum. According to certain aspects, the flexible wire, strip, or bar is constructed from one or more flexible wires that are coated in plastic. In some embodiments, the plastic is a shape-retaining plastic. Examples of the shape-retaining plastic include one of an amorphous thermoplastic, cellulose propionate, TR-90 by CARI STYLE, Ltd., or an ULTEM resin by SABIC (Saudi Basic Industries Corporation). In one embodiment, only the rear pleat 74 includes the flexible metal or plastic described above to retain the shape of the rear pleat as it contacts the nose and cheeks of the wearer. The reduction of metal components in a face mask is beneficial for environments that do not permit certain metals, for example when the mask is in the proximity of an MRI machine. FIGS. 6A, 6B, 7, and 8 illustrate schematic cross-sectional side views of face masks that highlight a profile of pleats relative to a wearer's face. FIG. 6A illustrates a conventional disposable face mask generally indicated at 601 with a first pleat 78, a second pleat 80, and a third pleat 82. The first pleat 78 is configured to rest beneath the nose of the wearer. However, as described above, one problem with the conventional design is that as tension is applied to the first pleat 78 to secure the mask to the wearer's face, an interior portion of the mask does not form an adequate seal against the wearer's nose. As a consequence, humid air caused by the wearer's breath escapes along a direction 84 towards the wearer's eyes and/or a direction 85 along the wearer's cheeks when the mask 601 is secured, as illustrated in FIG. 6B. Whether a nose wire or other mechanism is used to add rigidity to the interior portion of the mask 601 that is secured near the nose, there is still no structure capable of reducing the humidity of any air escaping along the directions 84, 85.

Figure 7:
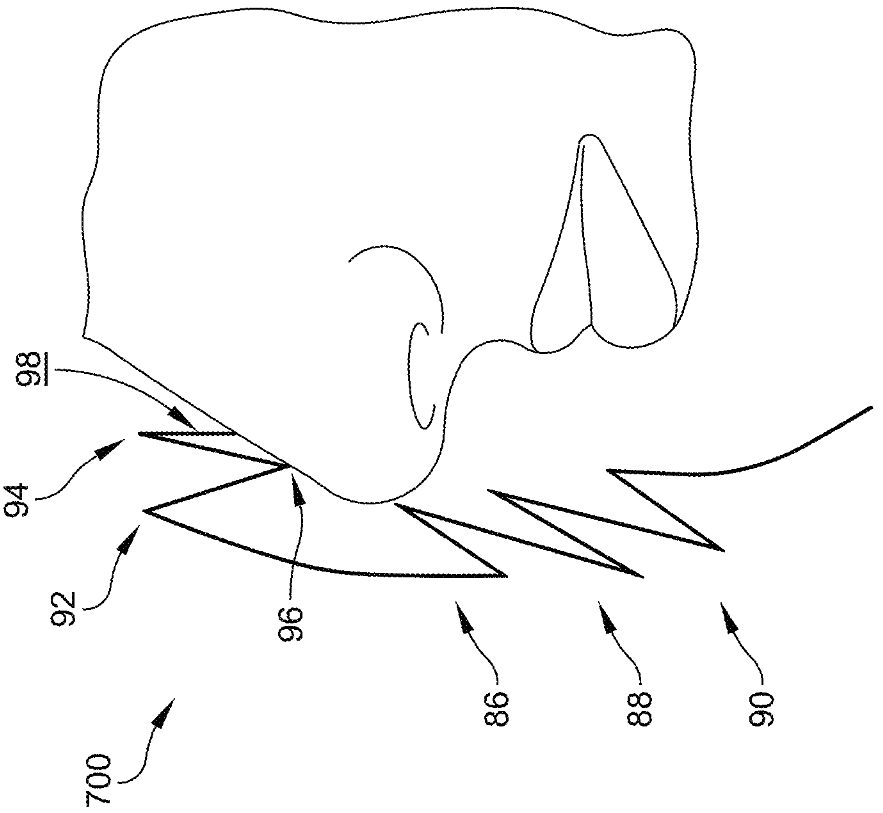
FIG. 7 illustrates a schematic cross-sectional side profile of a face mask showing a plurality of pleats near the mouth of a wearer of the mask and a plurality of pleats near the nose of the wearer according to an embodiment of the present disclosure.

FIG. 7 illustrates an embodiment of a face mask generally indicated at 700 (e.g., similar to the face mask 100, the face mask 200, and the face mask 500) including exterior pleats 86, 88, 90, interior pleats 92, 94, 96, and a sealing surface 98. In some examples, each surface of the mask 700 forming the interior pleats 92, 94, 96 is constructed or coated with a hydrophobic material. In other examples, only the exterior surfaces of the interior pleats 92, 94, 96 are coated with the hydrophobic material (i.e. only the surfaces near the nose and not inside the mask 700 that is exposed the wearer's breath from the mouth and nose). In other examples, only the interior surfaces (i.e., those surfaces inside the mask 700 near the wearer's face) forming the interior pleats 92, 94, 96 are coated with the hydrophobic material (i.e., excluding the interior surface connecting the first interior pleat 92 and the first exterior pleat 86). In an example, the material is polypropylene. The plurality of interior pleats 92, 94, 96, in addition to any hydrophobic coatings reduces the amount of air that escapes form the mask 700 towards the wearer's eyes and/or across the wearer's cheeks, thereby forming a better seal by having more points of contact the bridge of the nose and more contacting area between the surface 98 and the nose and cheeks. Additionally, the humidity of any escaping air is greatly reduced, thereby providing anti-fogging benefits.

Figure 8:
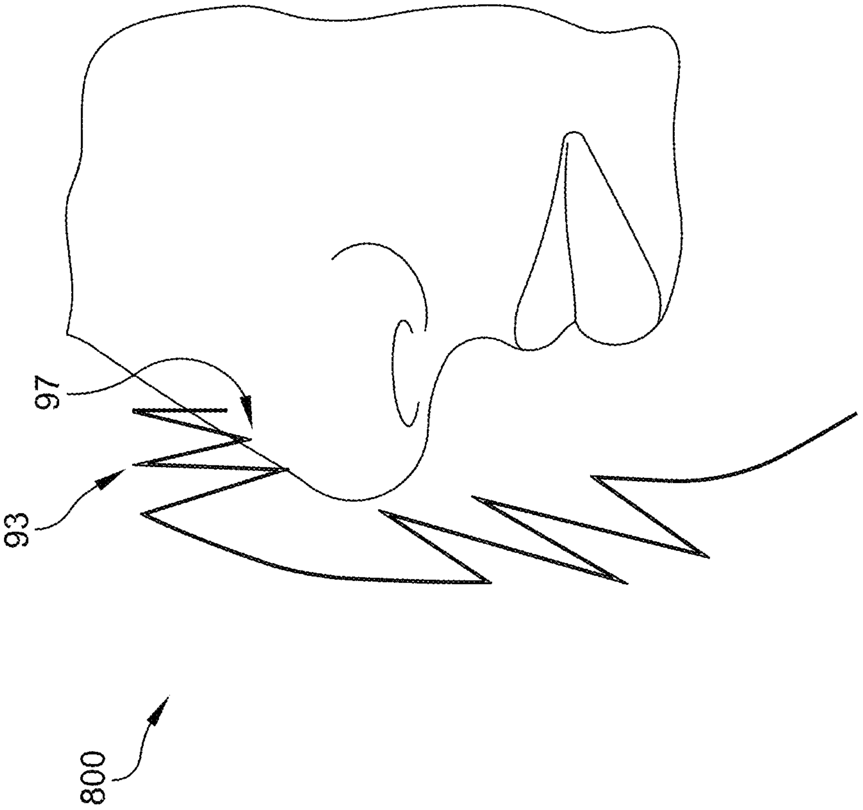
FIG. 8 illustrates a schematic cross-sectional side profile of a face mask showing a plurality of pleats near the mouth of a wearer of the mask and a plurality of pleats near the nose of the wearer according to an embodiment of the present disclosure.

Those of ordinary skill in the art would understand that variations of the masks 100, 200, 500, and 700 described above are contemplated herein. As an example, FIG. 8 illustrates a face mask generally indicated at 800 (e.g., similar to the mask 700) including additional interior pleats 93, 97. The additional interior pleat 97 increases the number of points of contact with the bridge of the nose and the mask 800 (compared to the face mask 700), and additionally provides more range of customization/adjustment for the wearer. It should be understood that other numbers of interior pleats may be provided to secure a face mask to the wearer. For example, instead of the two additional pleats illustrated in FIG. 8, three additional pleats are provided, thereby creating an additional point of contact on the bridge of the nose.

Aspects and embodiments described herein combat transmission of the SARS-Cov-2 virus (as well as other viruses/bacteria) via exhaling by drastically reducing condensation traveling to lenses on glasses (if worn) and forming a better seal with the wearer's face. Certain embodiments are constructed from hydrophobic materials for exterior surfaces, such as polypropylene, and hydrophilic materials, such as cotton, that contact the face, thereby providing medical-grade face masks and protective garments. It is understood that the term "protective garment" includes the term "face mask" as well as additional forms of personal protective equipment (PPE).

Certain embodiments of protective garments include one of the face masks 100, 200, 500, 700, or 800 described above incorporated into a pair of protective eyeglasses, a medical isolation gown, and/or a face shield, thereby providing increased protection to the wearer. In an example, as an alternative to the face mask 500 illustrated in FIG. 5, the face mask 500 may be attached to a nose support structure of pair of protective glasses or goggles via the rear pleat 74. In another example, one of the face masks 100, 200, 500, 700, or 800 is incorporated into the hood of a medical isolation gown (not shown).

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A face mask comprising:

a body portion including an outer surface and an inner surface, the body portion further including a plurality of exterior pleats configured to compress together and lay flat at rest and to elongate in a first direction towards a chin of the wearer of the face mask; and an interior portion secured to the inner surface of the body portion along an upper edge of the body portion, the interior portion including a plurality of interior pleats positioned from the upper edge of the body portion towards a lower edge of the body portion the plurality of interior pleats being configured to compress and lay flat against the body portion at rest and to elongate in a second direction towards a nose of the wearer at an acute angle from the first direction, whereby each of the plurality of interior pleats simultaneously contact the cheeks and the nose of the wearer in response to the elongation in the second direction to form a sealing surface, wherein the plurality of exterior pleats includes at least three pleats, and wherein the plurality of interior pleats includes at least two pleats.

2. The face mask of claim 1 wherein the interior portion is fabricated from a flexible material.

3. The face mask of claim 2 wherein the flexible material includes one or more of foam including a hydrophobic coating, cotton, and polypropylene.

4. The face mask of claim 2 wherein the flexible material is coated with a hydrophobic coating.

5. The face mask of claim 4 wherein the plurality of interior pleats includes the hydrophobic coating applied to surfaces connecting each of the plurality of interior pleats, the surfaces being exposed to the wearer's exhalation.

6. The face mask of claim 1 wherein the interior portion is attached to the inner surface of the body portion by one or more of stitching and adhesive.

7. The face mask of claim 1 wherein the plurality of interior pleats is configured to retain a shape of the sealing surface when simultaneously contacting the nose and the cheeks of the wearer.

8. The face mask of claim 7 wherein the interior portion further comprises a nose wire configured to retain the shape of the sealing surface when simultaneously contacting the nose and the cheeks of the wearer.

9. The face mask of claim 1, further comprising:

a first ear loop configured to secure the face mask to a first ear; and a second ear loop configured to secure the face mask to a second ear.

10. The face mask of claim 1, further comprising:

a first pair of straps configured to be tied together to secure the face mask to a first ear; and a second pair of straps configured to be tied together to secure the face mask to a second ear.

11. A protective garment comprising:

a body portion including an outer surface and an inner surface, the body portion further including a plurality of exterior pleats configured to compress together and lay flat at rest and to elongate in a first direction towards a chin of a wearer of the protective garment; and an interior portion secured to the inner surface of the body portion along an upper edge of the body portion, the interior portion including a plurality of interior pleats positioned from the upper edge of the body portion towards a lower edge of the body portion the plurality of interior pleats being configured to compress and lay flat against the body portion at rest and to elongate in a second direction towards a nose of the wearer at an acute angle from the first direction, whereby each of the plurality of interior pleats simultaneous contact the cheeks and the nose of the wearer at multiple points of contact along the nose of the wearer in response to the elongation in the second direction to form a sealing surface wherein the plurality of exterior pleats includes at least three pleats, and wherein the plurality of interior pleats includes at least two pleats.

12. The protective garment of claim 11 wherein the interior portion is fabricated from a flexible material.

13. The protective garment of claim 12 wherein the flexible material includes one or more of foam including a hydrophobic coating, cotton, and polypropylene.

14. The protective garment of claim 12 wherein the flexible material is coated with a hydrophobic coating.

15. The protective garment of claim 14 wherein the plurality of interior pleats includes the hydrophobic coating applied to surfaces connecting each of the plurality of interior pleats, the surfaces being exposed to the wearer's exhalation.

16. The protective garment of claim 11 wherein the interior portion is attached to the inner surface of the body portion by one or more of stitching and adhesive.

17. The protective garment of claim 11 wherein the plurality of interior pleats is configured to retain a shape of the sealing surface when simultaneously contacting the nose and the cheeks of the wearer.

18. The protective garment of claim 17 wherein the interior portion further comprises a nose wire configured to retain the shape of the sealing surface when simultaneously contacting the nose and the cheeks of the wearer.

19. The protective garment of claim 11, further comprising:

a first ear loop configured to secure the protective garment to a first ear; and a second ear loop configured to secure the protective garment to a second ear.

20. The protective garment of claim 11, further comprising:

a first pair of straps configured to be tied together to secure the protective garment to a first ear; and a second pair of straps configured to be tied together to secure the protective garment to a second ear.

* * * * *